(12) United States Patent
Becker et al.

(10) Patent No.: US 6,543,850 B1
(45) Date of Patent: Apr. 8, 2003

(54) ADJUSTABLE HINGE DEVICE FOR A MOTOR VEHICLE SEAT

(75) Inventors: Burckhard Becker, Solingen (DE); Robert Houston, Leichlingen (DE)

(73) Assignee: C. Rob Hammerstein & Co. KG (DE)

( * ) Notice: Subject to any disclaimer, the term of this patent is extended or adjusted under 35 U.S.C. 154(b) by 0 days.

(21) Appl. No.: 09/713,495

(22) Filed: Nov. 15, 2000

(30) Foreign Application Priority Data

Nov. 26, 1999 (DE) .......................................... 199 56 901

(51) Int. Cl.⁷ ................................................. B60N 2/02
(52) U.S. Cl. ...................................................... 297/367
(58) Field of Search ................................ 297/367, 366, 297/368, 378.12, 365, 369

(56) References Cited

U.S. PATENT DOCUMENTS 3,788,698 A * 1/1974 Perkins .................... 297/367 X
5,997,090 A * 12/1999 Baloche et al. ............. 297/367
6,332,649 B1 * 12/2001 Vossmann .................... 297/366

FOREIGN PATENT DOCUMENTS

DE 2328908 * 12/1974 ................. 297/367
DE 2329535 * 3/1975 ................. 297/366

* cited by examiner

Primary Examiner—Peter M. Cuomo
Assistant Examiner—Stephen Vu
(74) Attorney, Agent, or Firm—Akerman Senterfitt

(57) ABSTRACT

A hinge device for an adjustment device of a vehicle has a left planet wheel (28) which is rotatable about an axle (26) of the left planet wheel, a right planet wheel (30) which is rotatable about an axle (27) of the right planet wheel, a left toothed quadrant (40) in mesh with the left planet wheel (28) and a right toothed quadrant (42) in mesh with the right planet wheel (30). The two toothed quadrants (40, 42) are substantially centric to a hinge axle (24) and are connected to the second joint part (22). An elastic mechanism (78) is allocated to at least one of the planet wheels or toothed quadrants, and elastically pretension the meshing therebetween and eliminate any play therebetween. A driving mechanism (32) is in a driving connection with at least one of the planet wheels.

10 Claims, 3 Drawing Sheets

ADJUSTABLE HINGE DEVICE FOR A MOTOR VEHICLE SEAT

BACKGROUND OF THE INVENTION

The invention relates to an adjustable hinge device of a motor vehicle seat. The hinge provides for an adjustment of a first joint part relative to a second joint part about a hinge axle.

DESCRIPTION OF RELATED ART

A variety of embodiments of such hinge devices are well known In the art, reference is mode by way of example only to the prior printed publications of the German documents as cited in the following: 198 12 895.9, P 44 00 910.0, P 36 16 290.609 and P 36 16 164.0-09.

The adjustable hinge or armature of the type mentioned above is essentially intended to be used for a seat back joint in a seat of an automotive vehicle. It may however also be arranged at other places of an adjustable vehicle seat, e.g., in the underframe of the seat where it adjusts the sluing, i.e. swivelling position, of a sluing support serving as height adjustment of the seat area.

The armatures according to the prior art cited have a disadvantage that particularly comes to bear in their use as adjustable armatures for adjusting the incline of a seat back of a vehicle seat. It is practically impossible to carry the two joint pans relative to each other around the sluing axle without clearance, and so a slight bearing play is unavoidable. In case of a long lever arm, as it is the case with the seat back, even a slight bearing play is clearly noticeable at the upper and thus free end of the seat back. Although it has been tried to reduce the effect of the clearance by elastically pretensioning the seat back in one sluing direction or by providing the armature with elastic means, a clearance in the bearing arrangement of the two joint parts cannot be suppressed in the long run.

SUMMARY OF THE INVENTION

The object of the invention is to make a new attempt for an adjustable hinge device. The invention aims at dispensing with carrying a hinge shaft in bearings in a centric manner and at suggesting a hinge that self-centers without any Play.

The solution of the invention is to provide an adjustable armature for a sluing adjustment of a first joint part relative to a second joint part about a sluing axle, for an adjustment device of a vehicle seat. The armature may include the following gear parts; a left planet wheel which is carried in bearings on the first joint part in such a manner that it is rotatable about an axle of the left planet wheel; a right planet wheel that is arranged on the first joint part in such a manner that it rotates about an axle of the right planet wheel; a left toothed quadrant which meshes with the left planet wheel in a left area which is turned away from the right planet wheel; and a right toothed quadrant which meshes with The right planet wheel In an area which is turned away from the left planet wheel whereas the two toothed quadrants substantially run in a centric manner relative to the sluing axle and are connected to the second joint part. The armature may be additionally provided with elastic means which are allocated to at least one of the gear parts and which elastically pretension the meshing in the left area between the left toothed quadrant and the mating left planet wheel as well as the meshing in the right area between the right toothed quadrant and the mating right planet wheal in such a manner that the engagement in the left area and in the right area is free from play irrespective of the angular position chosen between the two joint parts. A driving means may be provided which has a driving connection with at least one of the planet wheels and which effects a relative motion in the left area and a relative motion in the right area between the corresponding gear parts during a drive.

This armature does without a bearing arrangement for a propeller shaft. The second joint part centers itself relative to the first joint part on the two planet gears which are connected to the first joint part. Thanks to the elastic means, the meshing is free from play at any place of the complete area of the sluing angle of the adjustable armature, both in the left area between the left planet gear and the left toothed quadrant and In the right area between the right planet gear and the right toothed quadrant. The second joint part is positioned relative to the first joint part by the corresponding meshing in the two areas. The second joint part does not need a shaft that is arranged in a centric manner relative to the sluing axle. The second joint part is carried off-center by the two planet wheels it is clearly stated that it is not necessary to carry the second joint part in the center, in the area of the sluing axle. Additional planet wheels may be provided to improve bearing and/or to better deflect forces.

The elastic means may be realized in such a manner that the planet gears are pretensioned outward toward the corresponding toothed quadrants and/or that the toothed quadrants are elastically pretensioned inward. The elastic inward pretension of the toothed quadrant toward the planet gears is preferred. The involute gear proved to be particularly efficient for meshing in the areas mentioned. It advantageously contributes to a play-free meshing.

The elastic pretension is preferably chosen to be so high that it is not canceled out under a normal load. A normal load is a load below the load encountered in the event of an accident. A load occasioned by an accident is encountered for example In the event of a rear collision at of a frontal collision and causes safety devices such as belt tighteners or air bags to be triggered.

In an advantageous embodiment, the drive means is a pinion which is arranged on one of the joint parts in such a manner that it is rotatable about the sluing axle and which may be driven. It preferably meshes with the two planet gears. On principle, the drive pinion may also be rotatable about an axle that does not coincide with the sluing axle.

In another preferred embodiment, the drive means is a double-lead screw which is carried in bearings on the first joint part in such a manner that it is rotatable about a worm axle running across the sluing axle and which meshes together with at least one planet gear, preferably with both planet gears. The screw is preferably a double-lead screw consisting of a part with left-handed thread and of a part with right-handed thread. The screw is preferably located between the two planet gears.

In a preferred embodiment, more than two planet gears may be provided. In this embodiment, the additional planet gears are preferably not driven but serve to support and guide the second joint part, The additional planet gear which meshes with the right toothed quadrant may be allocated in this way to the right planet gear. This additional right planet gear is preferably elastically pretensioned relative to the right toothed quadrant. Accordingly, an additional left planet gear may also be allocated to the left planet gear with all the additional features mentioned above.

In a preferred embodiment, the two toothed quadrants are arranged in mirror symmetry relative to an axis of the second joint part which runs through the sluing axle.

It proved advantageous to have the two toothed quadrants forming a unit with the second joint part. Manufacturing is thus simplified.

In an additional improvement, it is suggested to provide outside of each toothed quadrant a supporting arch which is arranged on the outer side of the second joint part that runs evenly spaced relative to the neighboring toothed quadrant and to also provide on the outside at some distance from the supporting arch, a supporting part which is connected to the first joint part. In case of an overload, at least one supporting part comes to rest on the supporting arch. The supporting arches provide protection against an overload of the armature, the armature particularly becomes more capable of withstanding forces that severely stress the two joint parts against each other, as for example in the case of loads occasioned by an accident and exerted onto the seat back of a vehicle seat.

It furthermore proved advantageous to have the toothed quadrants located on arms which extend from a main body of the second joint part and preferably have a free end. In this way, it is easy to design the toothed quadrants and the elastic means. In a preferred development, the free ends may be interconnected by elastic means. In so doing, they are elastically pretensioned relative to each other in addition to their own elasticity.

It proved advantageous to have the supporting parts arranged offset away from the main body of the second joint part relative to the plane in which the left planet wheel axle, the sluing axle and the right planet wheel axle run. Further advantages and characteristics of the invention will become apparent in the remaining claims.

BRIEF DESCRIPTION OF THE DRAWINGS

In the following preferred embodiments of the invention are described and are explained in more detail with reference to me drawing, in which.

DETAILED DESCRIPTION OF THE INVENTION

Figure 1:
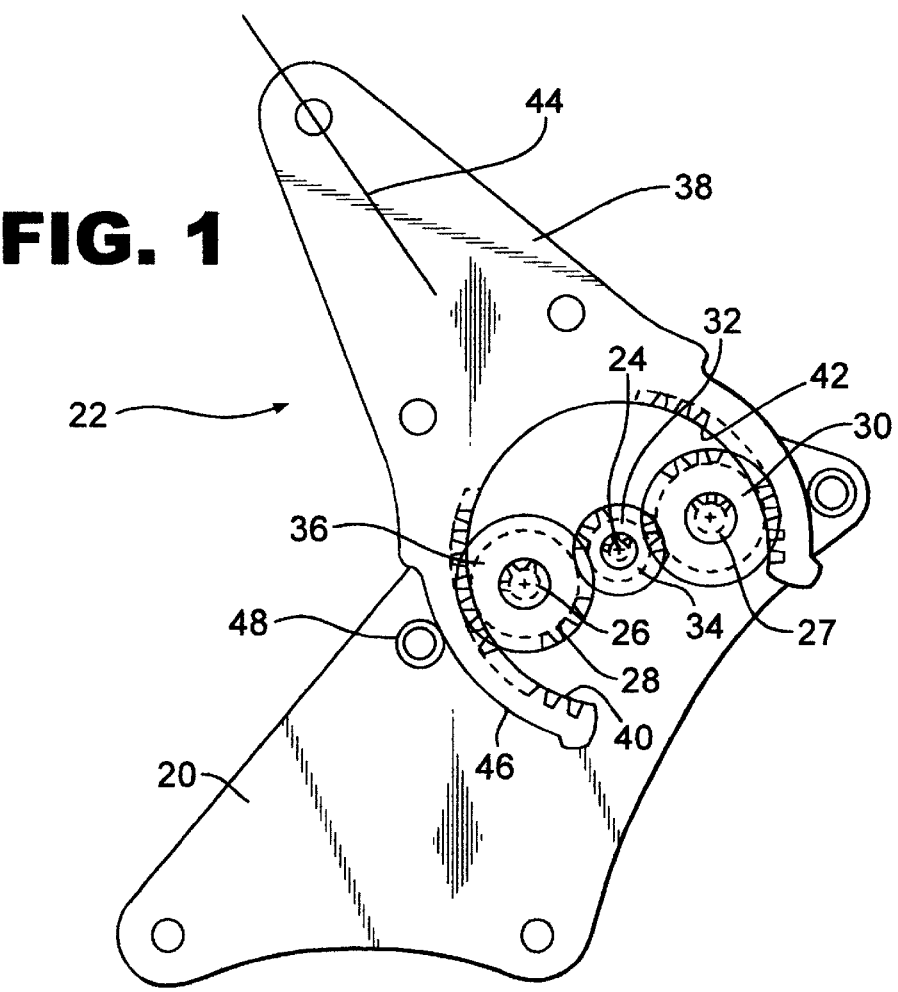
FIG. 1 is a top view of an adjustable armature according to the invention.

The Figures illustrate the adjustable armature for a sluing adjustment of a first joint part 20 relative to a second joint part 22 about a sluing axle 24 whose geometrical configuration is not prescribed. The armature has been designed in particular for adjustment devices of a vehicle seat, e.g., for an armature for the seat back or for the angle adjustment of a parallelogram arm in a height adjustment device. It is a characteristic of these applications that the maximum sluing angle by which the two joint parts 20, 22 may be adjusted relative to one another may amount to less than 180 degrees and amounts for example to about 100 degrees or less. In principle, the adjustable armature also permits rotational movements though, i.e., movements exceeding 360 degrees and even much more. In this connection, reference is made to the embodiment according to FIG. 7 which is designed as a swivel joint armature whilst the other embodiments have a limited angular range.

The embodiment according to FIG. 1 will be described first. The explanations given for this embodiment are also true for the other embodiments. The differences between these and the embodiment according to FIG. 1 will be dealt with individually in the description of the other Figures.

In the embodiment shown, the first joint part 20 is substantially a plate having the shape of a parallelogram, it has two lower bores for its attachment to a seat support for example. It has furthermore two upper bores for carrying the axles of the planet gears 26, 27 of a left-hand planet gear 28 and of a right-hand planet gear 30. A drive pinion 32 is arranged as drive means between the two planet gears 28, 30, and mashes with the teeth of the two planet gears 28, 30. The two planet gears 28, 30 are built according to the same design principle. The drive pinion 32 has a drive pinion axle 34. This axle lies on a connecting line 36 running through the two planet gear axles 26, 27.

The second joint part 22 has a main body 38 which is provided with bores for fastening this second joint part to a seat back support for example and also has a toothed area provided on two bent arms which have a left toothed quadrant 40 and a right toothed quadrant 42 on their inner surfaces facing each other. The toothed quadrants extend over approximately 100 degrees and run symmetrically to a mirror plane 44. The two arms are open at their free end over an angular range of approximately 90 degrees.

As shown in FIG. 1, the left toothed quadrant 40 meshes with the left planet gear 28, and the right toothed quadrant 42 meshes with the right planet gear 30 in the same way. The meshing is thus that upon removal of the two planet gears 28, 30 the two toothed quadrants 40, 42 spring inwards. Accordingly, the toothed quadrants 40, 42 elastically rest on the planet gears 28, 30 and position in this way the second joint part 22 relative to the first joint part 20. Owing to symmetry and irrespective of the angular position, the elastic force that acts on the planet gears 28, 30 through the toothed quadrants 40, 42 is largely constant. The farther the one planet gear is moved toward the free end of the corresponding arm, the nearer the other planet gear approaches the main body 38. In the vicinity of the main body, the spring path of the corresponding arm is smaller, in the vicinity of the free end however, it is greater. The spring force is accordingly greater in the vicinity of the main body 38 than it is in the vicinity of the free end of the arm on each of which the toothed quadrant 40 and 42 respectively are configured.

The arms with their toothed quadrants 40, 42 constitute the elastic means by means of which the meshing is maintained in the left area between the left-hand toothed quadrant 40 and the left-hand planet gear 28 and in the right area between the right-hand toothed quadrant 42 and the corresponding right-hand planet gear 30. The elastic restraint between the two arms, that is between the toothed quadrants 40, 42, is chosen to be so high that in normal operation, that is under loads that lie below the application of a force occasioned by an accident, the elastic pretension is not canceled out.

The meshing between the toothed quadrants 40, 42 and the planet goats 28, 30 is an involute meshing. The decisive Point is that, when only one tooth is moved into mesh, the positioning must be accurate.

The drive pinion axle 34 of the drive pinion 32 may be carried in the first joint part 20, but it may just as well be arranged in the second joint part 22, if an appropriate projection is provided to fit this purpose. In principle, it is not necessary to have the drive pinion axle 34 carried in one of the two joint parts 20, 22.

In practice, the sluing axle 24 adapts to the conditions of the moment. The position of the sluing axle 24 is not prescribed geometrically. In the embodiment according to FIG. 1, it substantially lies In the central line of the drive pinion axle 34. It may however depart from this point depending on the elastic situations and the work tolerances.

Each arm of the second joint part 22 has on its outer side a supporting arch 46 that has the same canter as the matching toothed quadrant 40 and 42 respectively. The supporting arches extend over approximately 70 degrees, they are limited at either end by projections. A supporting part 48 is assigned to each supporting arch 48, said supporting part being located a short distance apart from the supporting arch 46. The two supporting parts 48 are attached to the first joint part 20, they are of an essentially cylindrical design. Their connecting line runs parallel to the connecting line 36 and is offset by some millimeters toward the free ends of the arms. Under an overload the arm spring outward together with their toothed quadrants and are then supported by the supporting parts 48. Furthermore, the operating pivoting angle of the armature is limited by the supporting parts 48 cooperating with the projections of the supporting arches 46, the angle amounts to approximately 60 degrees.

Above the second joint part 22 there is an approximately lens-shaped covering plate 52 that is fastened by means of the supporting parts to the first joint part 20. This covering plate constitutes, together with the area of the first joint parts 20 located just underneath, a casing accommodating the planet wheels 28, 30 and the drive pinion 32.

Figure 2:
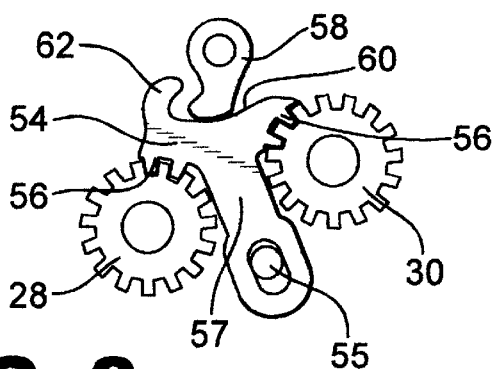
FIG. 2 is a top view of a stop means for the armature according to FIG. 1.
Figure 3:
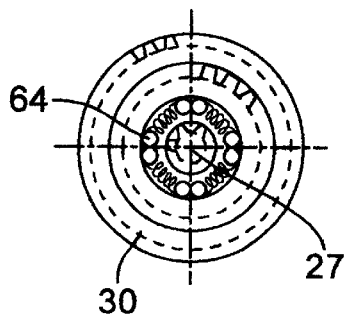
FIG. 3 is a top view of a planet gear with a grip roller free wheel for replacement of at least one of the two planet gears according to FIG. 1, the armature being motor-driven.

The FIGS. 2 and 3 illustrate further developments of this first embodiment: A blocking part 54 is movably fixed to the first joint part 20. To this purpose a guide pin 55 projects from the first joint part 20, said guide pin 55 passing through a long hole of this blocking part 54, The blocking part 54 may slightly swing back and forth about this guide pin 55. Its swinging motion is checked by its bumping into the two planet wheels 28, 30. Therefor, the blocking part 54 has a necked portion 57 in the area of the connecting line 36, said necked portion being somewhat narrower than the clearance between the two planet wheels 28, 30. On the other aide of this connection line 28 teeth 66 which may be moved into mesh with the teeth of the planet wheels 28, 30 are provided on the blocking part 54. To this effect, a pivoted pawl 58 is provided. In the illustration according to FIG. 2, it rests on a blocking side 60 of the blocking part 54 and thus pushes the two teeth 56 into mesh with the teeth of the two planet wheels 28, 30. When the pawl is rotated clockwise on the basis of the illustration according to FIG. 2, it meshes with a release area 62 of the blocking part 54 and pulls the blocking part 54 upward, setting it free in this way. Then, the armature may be adjusted.

In the embodiment according to FIG. 3, at least one of the two planet wheels 28, 30 is stepped, the step being formed by the axial superposition of two gear wheels of different diameters. At least one grip roller locking gear 64 as it is well known in this art, from DE 2 808 884 C2 for example, is provided. The configuration is such that a rotational movement may be induced in the planet wheel by way of the preferably motor driven drive pinion 32, said planet wheel being in gear with the matching toothed quadrant. The planet wheal blocks however in the reflux path of the forces, that Is when the toothed quadrant rotates under the drive of the planet wheal part by which it is engaged.

Figure 4:
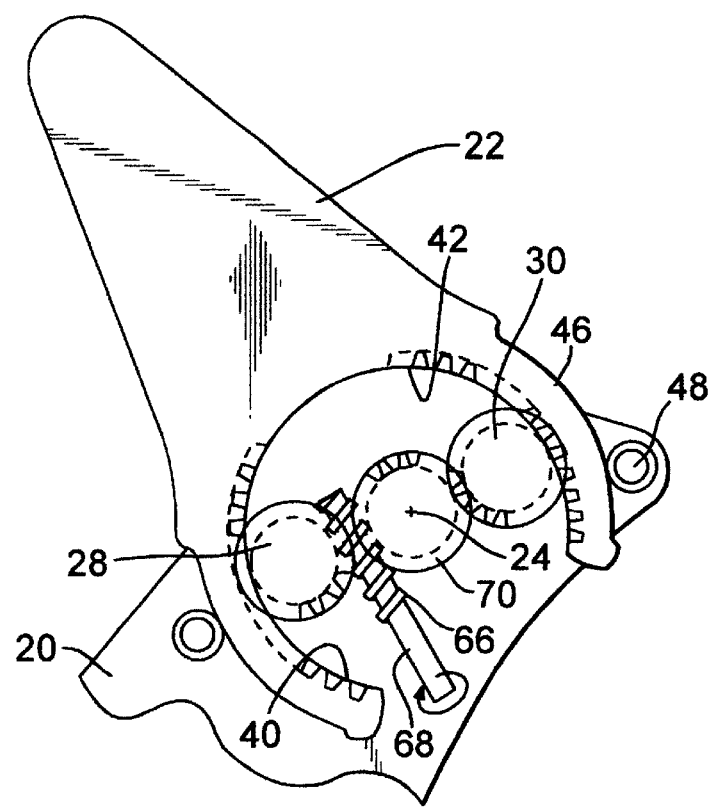
FIG. 4 is a top view of an armature having a worm drive.

In the embodiment according to FIG. 4, the two planet wheels 28, 30 are slightly smaller in their diameter than in the embodiment according to FIG. 1, so that there is some more space between the two of them. This space is used for drive means of an amended design. In the present case they are on one hand formed by a worm 66. which is preferably motor-driven, In the embodiment it is connected to an actual drive via a flexible shaft 68. It is directly in gear with the teeth of the left planet wheel 28. On the other hand, the drive means are designed as a return wheel 70, which is located in FIG. 4 on the right side of the worm 66. It mashes on one side with the worm 66 and on the other with the right planet wheel 30. It serves to reverse the direction of movement of this right-hand planet wheel. Again, all meshes are located on the connecting line 36. The elastic means are again realized by the resilient arms of the second joint part 22.

The embodiment according to FIG. 4 shows that, to the contrary of FIG. 1, the driving axle does not need to lie on the sluing axis 24. It may be offset parallel to the sluing axle 24, when the drive pinion 32 for example is not directly driven but is designed as a normal gear wheel, one of the planet wheels 28 or 30 being driven directly or an additional drive pinion that is in gear with one of the gear wheels 28 to 32 being provided instead. FIG. 4 shows a deviation of the driving axle by 90 degrees relative to the sluing axle 24.

In an alternative embodiment of FIG. 4, a double rack is provided instead of the worm 56. One part of the rack meshes with the teeth of the left-hand planet wheel 28, the other part, fixedly connected to it, meshes with the return wheel 70. The double rack is guided in a linear manner on the first joint part 20 and is driven by an electric motor. The electric motor is therefor provided with a threaded spindle and is fixedly connected to the double rack by way of a nut In which the threaded spindle may rotate.

Figure 5:
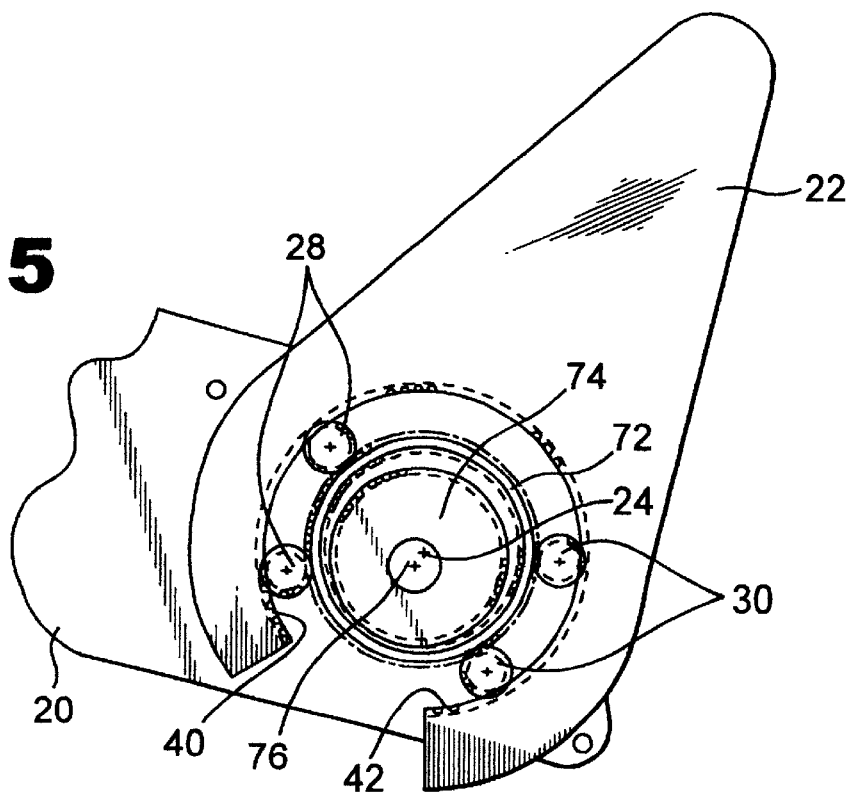
FIG. 5 is a top view of an armature with several planet gears, the drive is performed by way of a swash joint armature

In the embodiment according to FIG. 5, two left planet wheels 28 and two right planet wheels 30 are provided, all planet wheels being built according to the same design principle. The drive means is effected by several parts. The annular gear 72 is provided that meshes with the four planet wheels 28, 30 by its external teeth. Its internal teeth are coaxial to the external teeth. The external toothed wobble plate 74 is assigned to said internal toothing, said wobble plate being driven by means of a cam plate 76 in this way, an eccentric drive is obtained as it is known for example from the DE 1 755 421 C2 or DE 38 16 510 C2.

Figure 6:
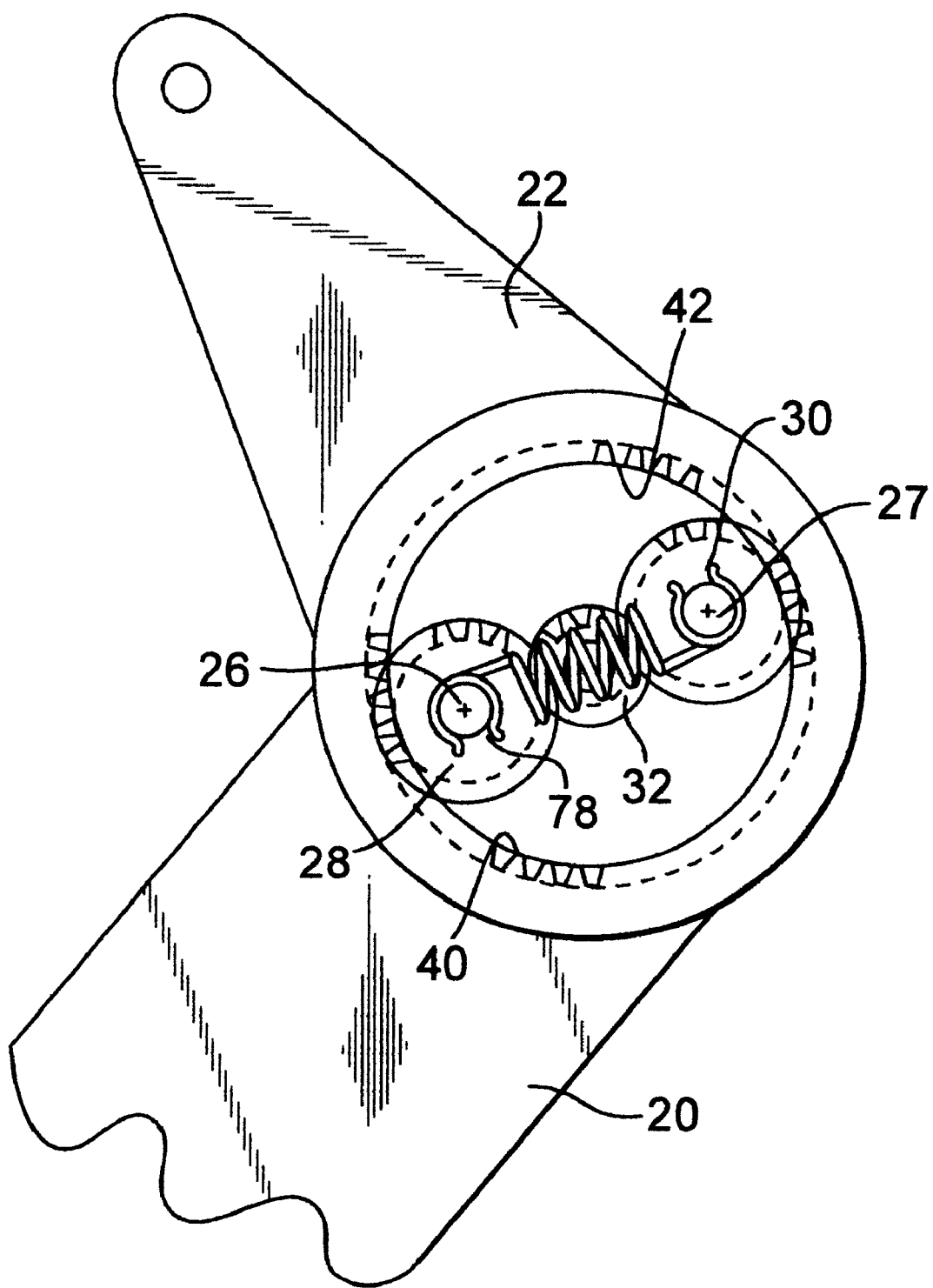
FIG. 6 is a top view of an armature similar to FIG. 1, this time however with planet gears that have outwardly directed spring action.

All embodiments, which have been discussed up to now, have in common that the elastic means are constituted by the arms of the second joint part 22. In other words, the toothing parts located between the toothed quadrants 40, 42 are held free from play, i.e., the meshing between the planet wheels 28, 30 and the toothed quadrants 40, 42 is accomplished by the fact that the toothed quadrants 40, 42 are elastically pretensioned inwards. FIG. 6 now shows an embodiment in which the toothed quadrants 40, 42 no longer decisively contribute to elasticity, here the elastic means are rather assigned to the planet wheels 28, 30. To this effect, the toothed quadrants 40, 42 are formed by providing a hole of the second joint part 22 with teeth arranged in a continuous way over its entire periphery, that is over a complete revolution of 360 degrees. The planet wheel axles 26, 27 are arranged in long holes of the first joint part 20 in such a manner that they are slidable along the connecting line 36. Strong pressure springs 78 are provided on both sides between the two planet wheel axles 28, 27 and push the planet wheels 28, 30 into mesh with the two toothed quadrants 40, 42. This armature is no longer limited to an operating angle below 360 degrees, it may now also perform rotational movements.

In the embodiment according to FIG. 6 the drive is performed by a drive pinion 32 In the same way than in the embodiment according to FIG. 1. It in however also possible to modify the embodiments according to the FIGS. 4 and 5 in such a way that the toothed quadrants 40, 42 are no longer elastically pretensioned inwards in direction of the sluing axle 24, but that the planet wheels 28, 30 are elastically pushed outward, away from the sluing axle 24. Combinations of the different alternatives are also possible, in which the toothed quadrants 40, 42 are provided on elastic arms and in which the planet wheels are elastically pretensioned outwards.

In the embodiments according to the FIGS. 1, 4 and 5 it is also possible to bridge the open area between the two free ends of the arms by means of a tension spring.

What is claimed is:

1. An adjustable hinge device of a vehicle seat having a first joint part, a second joint part and a hinge axle, the hinge device further comprising:
   a) a plurality of gear parts, including:
      a left planet wheel arranged on the first joint part and rotatable about an axle of the left planet wheel;
      a right planet wheel arranged on the first joint part and rotatable about an axle of the right planet wheel;
      a left toothed quadrant provided on the second joint part and which is in meshing engagement with the left planet wheel, the meshing engagement taking place in a left area of the left planet wheel, the left area facing away from the right planet wheel; and
      a right toothed quadrant provided on the second joint part and which is in meshing engagement with the right planet wheel, the meshing engagement taking place in a right area of the right planet wheel, the right area facing away from the left planet wheel, the left and the right toothed quadrants are substantially centric relative to the hinge axle;
   b) elastic means which are allocated to at least one of the left planet wheel, right planet wheel, left toothed quadrant and right toothed quadrant and which elastically pretension the meshing engagement in the left area between the left toothed quadrant and the left planet wheel and the meshing engagement in the right area between the right toothed quadrant and the right planet wheel, and
   c) driving means in driving connection with at least one of the left planet wheel and right planet wheel, whereby a relative motion between the left planet wheel and the left toothed quadrant and a relative motion between the right planet wheel and the right toothed quadrant are affected during an activation of the drive means.

2. The adjustable hinge device according to claim 1, wherein the the left toothed quadrant and the right toothed quadrant are arranged in mirror symmetry relative to an axis of the second joint part.

3. The adjustable hinge device according to claim 1, wherein the left toothed quadrant and the right toothed quadrant are made in one piece with the second joint part.

4. The adjustable hinge device according to claim 1, wherein a right supporting arch is located outside of the right toothed quadrant and a left supporting arch is located outside of the left toothed quadrant, the left supporting arch and the right supporting arch are arranged on an outer side of the second joint part and are evenly spaced relative to the respective toothed quadrant.

5. The adjustable hinge device according to claim 4, wherein a plane is defined by the axle of the left planet wheel and by the axle of the right planet wheel, wherein the supporting part is located on one side of said plane, and the main body of the second joint part is located on another side of said plane.

6. The adjustable hinge device according to claim 1, wherein the second joint part has a main body and arms extending from the main body of the second joint part and wherein the right toothed quadrant and the left toothed quadrant are each located on a respective said arm of the second joint part.

7. The adjustable hinge device according to claim 6, wherein a plane is defined by the axle of the left planet wheel and by the axle of the right planet wheel, wherein the supporting part is located on another side of said plane to the main body of the second joint part.

8. The adjustable hinge device according to claim 1, wherein both the left planet wheel and the right planet wheel have teeth and a blocking part is provided which is adjustable between a blocking position and a release position, wherein the blocking part, in said blocking position, engages the teeth of at least one of the left and right planet wheel and, in said release position, disengaged from said teeth.

9. The adjustable hinge device according to claim 1, wherein the right and left toothed quadrants are each provided with a free end part.

10. The adjustable hinge device according to claim 1, wherein the elastic means effect an elastic pretension, such that the meshing in the left area and the meshing in the right area are not released when the hinge device is subjected to a normal load, wherein a normal load of the hinge device is inferior to a load occurring in an event of an accident of a vehicle.

\* \* \* \* \*